United States Patent
Fisk et al.

(10) Patent No.: US 8,720,641 B2
(45) Date of Patent: May 13, 2014

(54) METAL PANEL ASSEMBLY

(75) Inventors: Jonathan W. Fisk, Canton, MI (US); Daniel J. Driscoll, Canton, MI (US); William A. Mackowski, Shelby Township, MI (US); James F. Keys, Northville, MI (US)

(73) Assignee: Shiloh Industries, Inc., Valley City, OH (US)

(*) Notice: Subject to any disclaimer, the term of this patent is extended or adjusted under 35 U.S.C. 154(b) by 50 days.

(21) Appl. No.: 13/388,625

(22) PCT Filed: Aug. 11, 2010

(86) PCT No.: PCT/US2010/045172
§ 371 (c)(1),
(2), (4) Date: Feb. 2, 2012

(87) PCT Pub. No.: WO2011/019818
PCT Pub. Date: Feb. 17, 2011

(65) Prior Publication Data
US 2012/0125710 A1    May 24, 2012

Related U.S. Application Data

(60) Provisional application No. 61/232,988, filed on Aug. 11, 2009.

(51) Int. Cl.
| | |
|---|---|
| *E04B 1/82* | (2006.01) |
| *F16F 15/02* | (2006.01) |
| *E04B 1/74* | (2006.01) |
| *F16F 15/00* | (2006.01) |
| *F16F 7/00* | (2006.01) |

(52) U.S. Cl.
USPC .................... 181/290; 181/207; 156/292

(58) Field of Classification Search
USPC .......... 181/290, 207, 209, 288; 52/144, 145; 156/292, 210
See application file for complete search history.

(56) References Cited

U.S. PATENT DOCUMENTS

| | | | |
|---|---|---|---|
| 2,173,797 A | 9/1939 | Toohey et al. | |
| 2,304,718 A * | 12/1942 | Swart | 428/189 |

(Continued)

FOREIGN PATENT DOCUMENTS

| | | |
|---|---|---|
| DE | 102007041484 A1 | 3/2009 |
| EP | 0726295 A1 | 8/1996 |

(Continued)

OTHER PUBLICATIONS

Written Opinion & International Search Report for PCT/US10/045172 May 2, 2011, 9 pages.

(Continued)

*Primary Examiner* — Edgardo San Martin
(74) *Attorney, Agent, or Firm* — Reising Ethington P.C.

(57) ABSTRACT

A metal panel assembly that may be used in a number of different applications, particularly those that are concerned with improved stiffness and/or reduced vibration and noise. According to an exemplary embodiment, the metal panel assembly has a multi-layer or sandwich construction and includes a metal body layer, a sound damping adhesive layer, and a metal outer layer. The outer layer is bonded to the body layer via the adhesive layer and improves the stiffness and/or reduces vibrations in the metal panel assembly. The outer layer may include a number of contact sections that confront the body layer through the adhesive layer, as well as a number of raised sections that are spaced from the body layer and increase or otherwise improve the stiffness of the metal panel assembly. In one embodiment, the raised sections resemble channels and are generally arranged in a column-like pattern; in another embodiment, the raised sections resemble ribs and are generally arranged in a grid-like pattern.

17 Claims, 4 Drawing Sheets

(56) References Cited

U.S. PATENT DOCUMENTS

| | | | | |
|---|---|---|---|---|
| 3,020,184 | A * | 2/1962 | Cubberley et al. | 428/138 |
| 3,058,704 | A * | 10/1962 | Bergstedt | 244/119 |
| 3,078,971 | A * | 2/1963 | Wallerstein, Jr. | 52/403.1 |
| 3,087,571 | A | 4/1963 | Kerwin | |
| 3,159,249 | A * | 12/1964 | Lazan | 188/268 |
| 3,327,812 | A * | 6/1967 | Lazan | 188/268 |
| 3,386,527 | A * | 6/1968 | Daubert et al. | 181/208 |
| 3,648,828 | A * | 3/1972 | McCaffrey et al. | 198/763 |
| 3,976,269 | A * | 8/1976 | Gupta | 244/119 |
| 4,223,073 | A * | 9/1980 | Caldwell et al. | 428/422 |
| 4,414,257 | A * | 11/1983 | Haraga et al. | 428/182 |
| 4,433,023 | A * | 2/1984 | Ohta et al. | 428/182 |
| 4,516,658 | A * | 5/1985 | Scarton et al. | 181/208 |
| 4,594,281 | A * | 6/1986 | Haraga et al. | 428/172 |
| 4,718,214 | A * | 1/1988 | Waggoner | 52/783.19 |
| 4,828,202 | A * | 5/1989 | Jacobs et al. | 244/117 R |
| 4,851,271 | A * | 7/1989 | Moore et al. | 428/34.5 |
| 4,906,501 | A | 3/1990 | Honma et al. | |
| 5,851,342 | A * | 12/1998 | Vydra et al. | 156/324 |
| 5,855,353 | A * | 1/1999 | Shaffer et al. | 248/638 |
| 5,858,509 | A * | 1/1999 | Polch et al. | 428/166 |
| 5,895,013 | A * | 4/1999 | Towfiq | 244/119 |
| 5,895,538 | A * | 4/1999 | Hatayama et al. | 156/87 |
| 6,110,985 | A * | 8/2000 | Wheeler | 521/83 |
| 6,202,462 | B1 * | 3/2001 | Hansen et al. | 72/199 |
| 6,455,146 | B1 * | 9/2002 | Fitzgerald | 428/318.4 |
| 6,481,545 | B1 * | 11/2002 | Yano et al. | 188/264 G |
| 6,482,496 | B1 * | 11/2002 | Wycech | 428/71 |
| 6,536,555 | B1 * | 3/2003 | Kelsic et al. | 181/207 |
| 6,647,715 | B2 * | 11/2003 | Farkas | 60/323 |
| 6,878,432 | B2 * | 4/2005 | Ueda et al. | 428/174 |
| 7,070,848 | B2 * | 7/2006 | Campbell | 428/137 |
| 7,784,165 | B2 * | 8/2010 | Xiao et al. | 29/447 |
| 7,837,147 | B2 * | 11/2010 | Liguore et al. | 244/119 |
| 2005/0244617 | A1 | 11/2005 | Hetherington et al. | |
| 2010/0196736 | A1 | 8/2010 | Böger et al. | |
| 2010/0206662 | A1 * | 8/2010 | Mitsuoka et al. | 181/207 |
| 2011/0315473 | A1 * | 12/2011 | Fetsko et al. | 181/211 |

FOREIGN PATENT DOCUMENTS

| | | |
|---|---|---|
| JP | 5131588 | 5/1993 |
| JP | 7066588 | 3/1995 |
| WO | WO0109455 | 2/2001 |
| WO | WO2005084933 | 9/2005 |

OTHER PUBLICATIONS

Extended Search Report for EP10808695.0, Dec. 6, 2013, 6 pages.

* cited by examiner

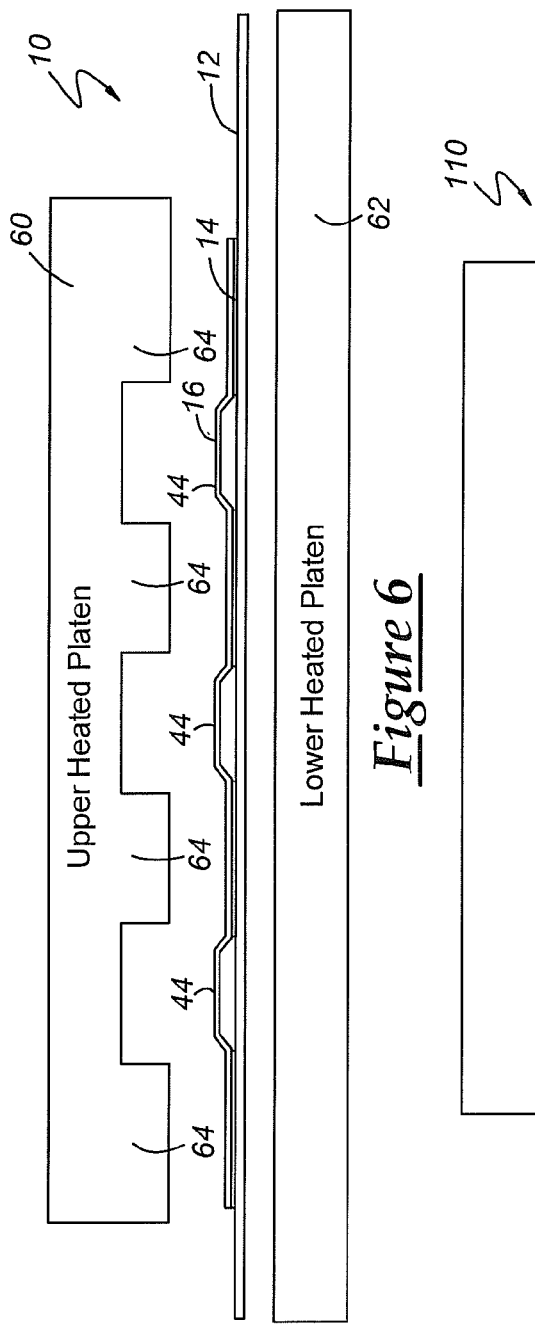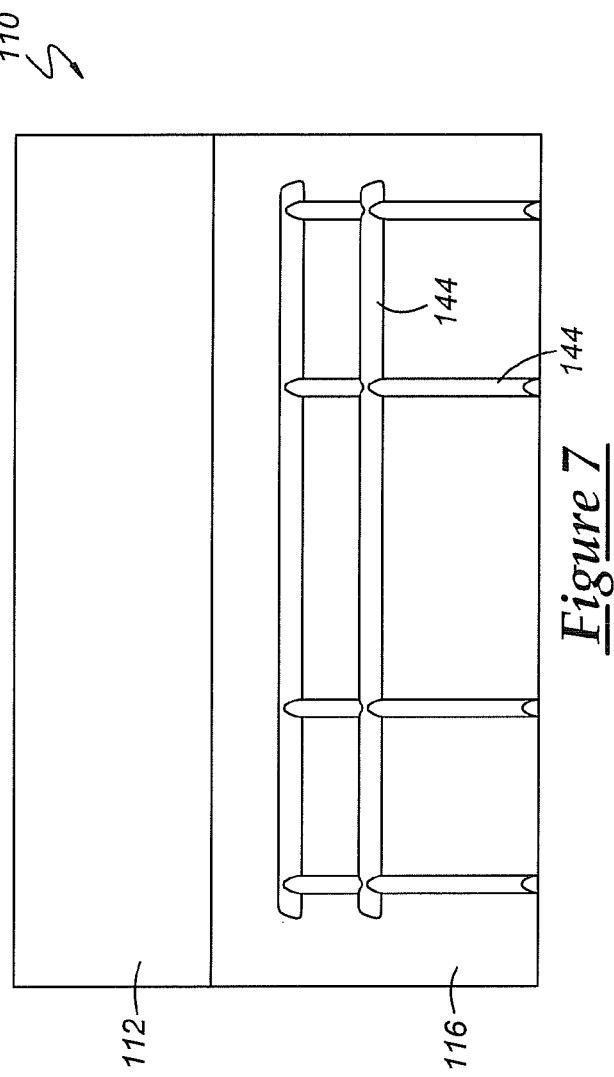

METAL PANEL ASSEMBLY

REFERENCE TO RELATED APPLICATIONS

This application claims the benefit of U.S. Provisional Ser. No. 61/232,988 filed on Aug. 11, 2009.

FIELD OF INVENTION

The present invention generally relates to metal panel assemblies and, more particularly to, multi-layer metal panel assemblies that may provide added stiffness, structural integrity, vibration damping and/or noise reduction to the applications in which they are used.

BACKGROUND

Articles that have been damped for sound can include some type of viscoelastic material applied to a vibratory article, such as an automotive component. The viscoelastic material absorbs and dissipates the vibrational energy generated by the article by converting mechanical energy associated with the vibrations into thermal energy that is dispersed within the sound damping material layer, and thus reduces the noise associated therewith. There are several different structures commonly used for sound damping purposes, including: free-layer structures, constrained-layer structures, and laminates.

Free-layer structures are structures where a sound damping viscoelastic material by itself is applied to the surface of a vibratory article. In such an arrangement, vibratory or acoustical energy created by a noise or vibration source on one side of the article is dissipated in the adjacent viscoelastic layer so that it is attenuated. In the case of constrained-layer structures, the sound damping viscoelastic material may act as an adhesive and is sandwiched between the vibratory article and an additional rigid constraining layer. The vibration damping is generally due to relative movement between the vibratory article and the rigid constraining layer which causes a shearing movement in the viscoelastic material which translates into heat energy. Sound damping laminates perform much in the same way as constrained-layer structures, however the vibratory article includes a pair of thin constraining layers with a viscoelastic adhesive layer therebetween.

SUMMARY

According to one aspect, there is provided a metal panel assembly comprising a sound damping adhesive layer, a body layer, and an outer layer. The outer layer may include a plurality of contact sections that confront the body layer through the sound damping adhesive layer and a plurality of raised sections that are spaced from the body layer. The contact sections may help dampen vibrations and/or noise in the metal panel assembly and the raised sections may help stiffen the metal panel assembly.

According to another aspect, there is provided a metal panel assembly comprising a sound damping adhesive layer, a metal body layer, and a metal outer layer. The metal outer layer may include a plurality of flat contact sections that confront the body layer through the sound damping adhesive layer to form a constrained layer structure, and a plurality of channel-like raised sections that are spaced from the body layer across a plurality of spaces to form a series of stiffening features. The metal outer layer is a patch that is attached to a particular area of interest on the metal body layer so that it helps dampen vibrations and/or noise in the metal panel assembly and helps stiffen the metal panel assembly.

According to another aspect, there is provided a method for manufacturing a metal panel assembly. The method may comprise the steps of: (a) providing a metal body layer; (b) providing a metal outer layer having one or more elongated contact sections and one or more elongated raised sections; (c) applying a sound damping adhesive layer between the metal body layer and the metal outer layer; (d) bringing the metal outer layer and the metal body layer together so that the contact sections of the metal outer layer confront the metal body layer through the sound damping adhesive layer; and (e) curing the sound damping adhesive layer.

DESCRIPTION OF THE DRAWINGS

A preferred exemplary embodiment of the invention will hereinafter be described in conjunction with the appended drawings, wherein like designations denote like elements, and wherein:

FIG. 6 schematically shows an exemplary apparatus that may be used to manufacture a metal panel assembly, such as the exemplary metal panel assembly of FIG. 3;

FIGS. 7-8 are top views of another exemplary metal panel assembly, where the metal panel assembly includes raised sections generally arranged in a grid-like pattern.

DESCRIPTION OF PREFERRED EMBODIMENT

Figure 1:
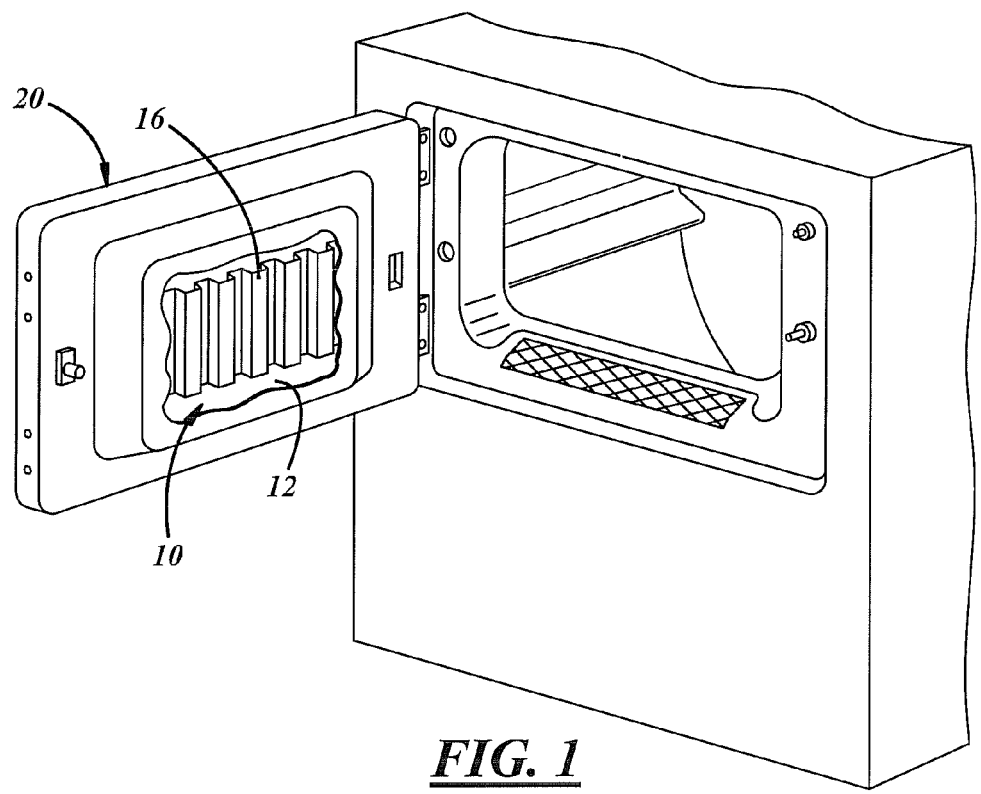
FIG. 1 shows an exemplary application for the metal panel assembly, where the metal panel assembly is attached to the inside of a dryer door.

The metal panel assembly 10 described herein may be used in a number of different applications, particularly those that are concerned with improved stiffness and/or reduced vibration and noise. Generally, metal panel assembly 10 includes a body layer 12, an adhesive layer 14, and an outer layer 16, and the multi-layer construction is designed to improve the stiffness or structural integrity of the overall assembly while at the same time damping or reducing vibrations and noise therein. Metal panel assembly 10 may be incorporated into any number of different applications, including dryer doors (shown in FIG. 1), vehicle dash panels or firewalls (FIG. 2), as well as any other suitable application including, but certainly not limited to, other household appliances (e.g., washing machines, ovens, dishwashers, microwave ovens, etc.), vehicle components (e.g., hoods, roofs, deck lids, door panels, floor boards, etc.), agricultural equipment, lawn equipment, etc. Although metal panel assembly 10 is described below in the context of a multi-piece assembly having two metal layers, it is possible for the metal panel assembly to only have a single metal layer; that is, metal panel assembly 10 may be provided where only one of the body and outer layers 12, 16 is metal and the other is made from some non-metal material, like a rigid plastic.

Figure 2:
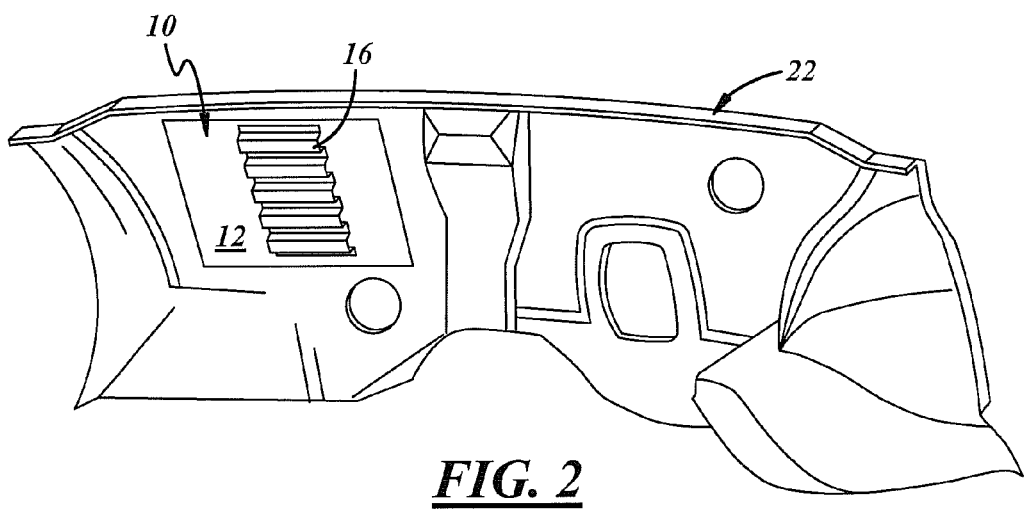
FIG. 2 shows another exemplary application for the metal panel assembly, where the metal panel assembly is attached to a vehicle dash panel.

According to the exemplary embodiment shown in FIGS. 1-4, a metal panel assembly 10 has a multi-layer or sandwich construction that includes a body layer 12, an adhesive layer 14, and an outer layer 16. In this embodiment, outer layer 16 acts as a patch that is applied to a particular area of interest on the body layer 12 so that it helps dampen vibrations and/or noise in the metal panel assembly 10 and helps stiffen the metal panel assembly. The amount of damping and/or stiffening that is provided by outer layer 16 may depend on the particular needs of the application and is not limited to any specific quantitative ranges. Though metal panel assembly 10 is shown and described having these three particular layers, it should be appreciated that the metal panel assembly may have additional layers or features such as another layer joined to body layer 12 and/or outer layer 16. The exact construction and number of layers in the metal panel assembly can vary and oftentimes depends on the particular application in which it is used. Metal panel assembly 10 may constitute the main structural piece or component of the application in which it is used (e.g., the metal panel assembly in FIG. 1 is the front side of dryer door 20), or it can simply be part of a patch that is locally applied or attached to a larger component (e.g., the metal panel assembly in FIG. 2 is a patch that is attached to a larger fire wall 22). These are only some of the possible embodiments of metal panel assembly 10, as others also exist.

Body layer 12 constitutes the base structure or foundation of metal panel assembly 10, and carries adhesive layer 14 and outer layer 16. In some applications, such as the dryer door 20 shown in FIG. 1, the body layer 12 is actually part of an exterior or "show" surface which a user sees when using the machine (the opposite side of body panel 12 is the front side of dryer door 20). In other applications, like the vehicle firewall 22 shown in FIG. 2, the body layer 12 is simply an internal component that is not visible to a user. In either case, it is possible for body layer 12 to be a substantially flat or planar component, or for it to be substantially contoured or shaped from a metal working process or the like. If body panel 12 is contoured or shaped, then it may be desirable to have flat or other suitable contact sections on its surface in order to flushly engage outer layer 16, as will be explained.

Figure 4:
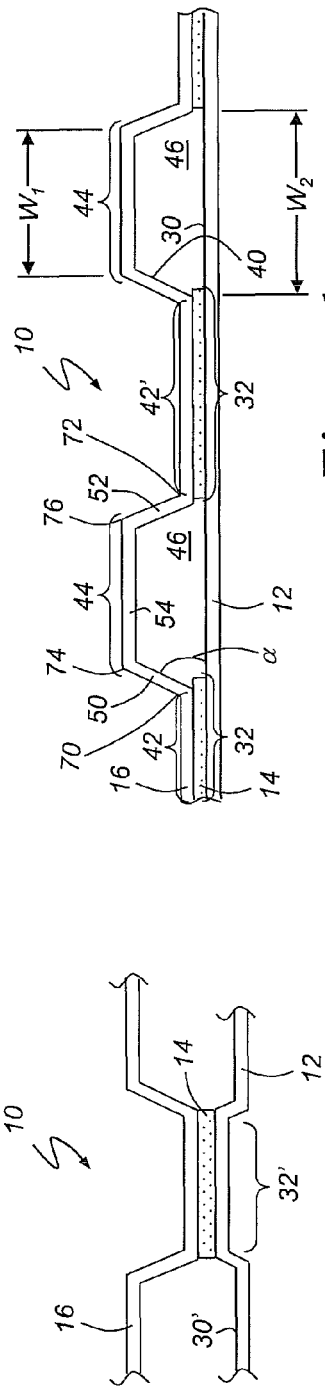
FIG. 4 is a side view of the exemplary metal panel assembly of FIG. 3.
Figure 5:
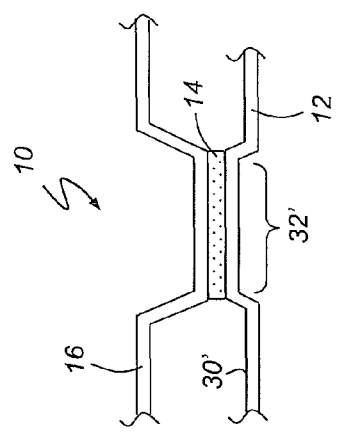
FIG. 5 is a side view of another exemplary metal panel assembly.

As best illustrated in FIG. 4, body layer 12 has a confronting surface 30 that opposes outer layer 16 and has a number of contact sections 32. The contact sections 32 may be flush with confronting surface 30 so that the surface is a flat plane lacking any noticeable surface features (as shown in FIG. 4), or contact sections 32 could be raised or indented such that they extend away from the confronting surface (as shown in FIG. 5). According to the exemplary embodiment in FIG. 5, contact sections 32' are flat elongated sections that rise from confronting surface 30' like platforms to meet and support outer layer 16. Of course, other confronting surface and contact section embodiments could be used instead. For example, body layer 12 could be curved or rounded in one dimension, in which case outer layer 16 should be similarly curved or rounded so that the two layers can be brought together in a complementary fashion and bonded together with adhesive layer 14. Body layer 12 can be made from any number of different materials, including rigid plastics and metals such as stainless steel, galvanized steel, aluminum, and alloys thereof In the example of dryer door 20, body layer 12 is made from stainless steel and has a thickness of about 0.10 mm to 0.75 mm; of course, other materials and thicknesses are possible. As a general matter, body layer 12 is usually thicker than outer layer 16, though it need not be. And, depending on the material, body layer 12 can be made from a coil of rolled stock material or from flat blanks that have already been blanked, trimmed, stamped, or otherwise metal worked into individual pieces. In some embodiments, it is possible for the body layer itself to be a laminate and/or a patch laminate and to include at least two separate rigid layers (e.g., metal layers) bonded together with a separate adhesive layer. In such a case, the adhesive layer in the body layer laminate may be the same or different from adhesive layer 14, so that peak sound damping characteristics and adhesion levels can be tailored to meet the specific needs of the application.

Adhesive layer 14 bonds body layer 12 and outer layer 16 together and preferably assists with vibration and/or noise damping. The exact composition, location, thickness, amount of surface area, and other characteristics of adhesive layer 14 can be influenced by a number of factors, including the particular application in which metal panel assembly 10 is used. Some factors that may influence the material selection for adhesive layer 14 include the materials to which it is bonding, the desired vibration damping effect, the desired adhesion, and the intended temperature range during operation. The amount of vibration damping or the adhesion strength between the different layers can be adjusted as needed. For example, if it is known that a particular area of dryer door 20 is subject to significant vibrations and noise, then the thickness and/or surface area of adhesive layer 14 can be increased in that area of interest. In addition to vibration and noise damping, adhesive layer 14 may also provide a barrier or separation between the materials of the body and outer layers 12, 16; thus, avoiding a bimetal process where dissimilar metals attack or corrode one another. According to an exemplary embodiment, sound damping adhesive layer 14 is a viscoelastic adhesive layer that is comprised of an acrylate-based thermoset resin and has a thickness of about 0.005 mm to 0.05 mm; however, other adhesive compositions and thicknesses may be used instead. Sound damping adhesive layer 14 may work with body layer 12 and outer layer 16 to form a constrained layer structure.

Outer layer 16 is bonded or attached to body layer 12 via adhesive layer 14 and improves the stiffness and/or reduces vibrations in metal panel assembly 10. The exact construction, location, material make-up, shape, size, thickness, etc. of outer layer 16 can be impacted by a number of different factors; such factors may include the application in which metal panel assembly 10 is used, the composition of adhesive layer 14 and/or body layer 12, and of the desired amount of rigidity or vibration damping in metal panel assembly 10. In this way, the stiffness or structural integrity of metal panel assembly 10 can be adjusted or tailored for a particular application. For example, if a particular area of dryer door 20 is subject to bending or otherwise requires stiffening, then a relatively thick outer layer 16 or an outer layer with taller ribs or raised sections can be used at the particular area of interest in order to bolster the stiffness or improve the overall structural integrity thereat. If metal panel assembly 10 is provided in laminate form, then outer layer 16 may be a single piece of metal that is sized to cover the entire body layer 12; if the metal panel assembly is provided in patch form, then the outer layer may only cover a portion of the surface area of the body layer (e.g., metal panel assembly 10 that is used in the firewall 22 of FIG. 2 has an outer layer 16 that covers about 40% of body layer 10). In one exemplary embodiment, outer layer 16 is made from galvanized steel and has a thickness of about 0.25 mm-100 mm; of course other materials such as aluminum and cold rolled steel and other thicknesses are also possible. It should be noted that the exemplary outer layer 16 is thicker than the exemplary body layer 12; this is because the body layer is comprised of stainless steel and to provide a stainless steel layer as thick as this outer layer would add a significant amount of cost and weight to metal panel assembly 10. Other embodiments and arrangements for outer layer 16 may be used instead.

In another exemplary embodiment, outer layer 16 further includes separate and distinct layers (e.g., the outer layer itself includes first and second outer layers). For example, it is possible for a first outer layer 16 to be bonded to body layer 12 by a first adhesive layer 14, and for a second outer layer (not shown) to be bonded to first outer layer 16 with a second adhesive layer. In such a multi-layer arrangement, the two adhesive layers may be the same or they may be different and specifically selected for certain adhesion and/or sound damping characteristics. For instance, the first adhesive layer could be tuned to damp vibrations over a first temperature and/or frequency range, while the second adhesive layer could be designed to damp vibrations over a second temperature and/or frequency range. These two ranges could significantly overlap—for example, if one is particularly concerned with a certain temperature and/or frequency range—or they could be staggered in order to cover a broader or more expansive overall temperature and/or frequency range.

Figure 3:
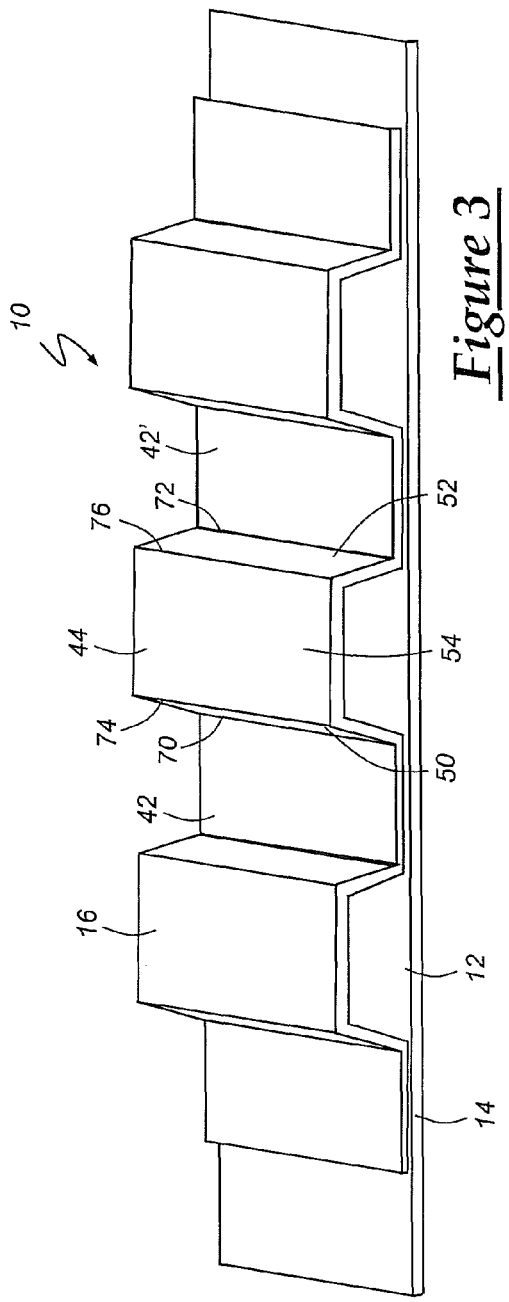
FIG. 3 is a perspective view of an exemplary metal panel assembly, where the metal panel assembly includes raised sections generally arranged in a column-like pattern.

Referring to the exemplary embodiment shown in FIGS. 3-4, outer layer 16 has a confronting surface 40 that opposes body layer 12, contact sections 42 that confront the body layer through the adhesive layer, and a number of raised sections 44 that are spaced from the body layer and increase or otherwise improve the stiffness of the overall metal panel assembly. Contact sections 42 may be designed to physically engage corresponding contact sections 32 of body panel 12 through adhesive layer 14 (see different embodiments in FIGS. 4 and 5). According to the exemplary embodiment shown in FIGS. 1-4, contact sections 42 are elongated strips that are generally parallel to metal body layer 12 (i.e., they have parallel surfaces) and are separated from the metal body layer through the thickness of the sound damping adhesive layer 14. The flat contact sections 42 may confront metal body layer 12 through sound damping adhesive layer 14 in such a way as to form a constrained layer construction, as is appreciated by those skilled in the art.

Raised sections 44 extend away from body layer 12 and can be constructed in a number of different shapes, including the trapezoidal or channel-like shape shown here that includes inclined portions 50, 52 and flat portion 54. The height, width, length, and/or angle α of inclined portions 50, 52 can be altered to address certain stiffness, rigidity or other structural requirements. For example, widths $W_1$ and $W_2$ may be minimized and angle a may be an acute angle (i.e., between 0-90°), a right angle, or an obtuse angle (i.e., between 90-180°). By adjusting these and other characteristics of outer layer 16, the stiffness and sound damping performance of metal panel assembly 10 may be improved (generally, the taller the raised sections the greater the stiffening and the more surface area of outer layer 16 that confronts body layer 12 the greater the sound damping). Flat portion 54 is shown here as being flat, but it could be constructed to have a concave, convex or other shape instead. The corners formed between sections 42 and 44 may be formed with a sharp edge or a radiused corner (generally, the tighter the radius the more rigidity and stiffness). Raised sections 44 are generally parallel to one another and are arranged in a column-like pattern where they do not cross one another; however, this is only one possibility, as other embodiments could employ a grid-like pattern where the various raised sections are generally perpendicular to and cross one another, as will be subsequently explained. According to an exemplary embodiment, each raised section 44 is an elongated channel that is separated from metal body layer 12 by an elongated space 46, and includes a first inclined portion 50 connected along an edge 70 to an adjacent contact section 42, a second inclined portion 52 connected along an edge 72 to a different adjacent contact section 42', and a flat portion 54 that is generally parallel to metal body layer 12. Flat portion 54 may include edges 74 and 76 connected to inclined portions 50 and 52, respectively.

During manufacturing, body layer 12 and/or outer layer 16 may be formed according to a number of different techniques, including roll forming, press brake, stamping, hydroforming, CNC bending, stretch bending, extruding, or any other suitable process known in the art. In the exemplary embodiments shown in FIG. 1-6, body layer 12 may be blanked from coiled material and outer layer 16 may be roll formed from coiled or blanked stock; the particular configuration of the elongated contact and raised sections 42 and 44 make them particularly well suited for roll forming Adhesive layer 14 can be applied between body layer 12 and outer layer 16 in a number of ways. In an exemplary embodiment, sound damping adhesive layer 14 is applied to the underside or confronting surface 40 of contact sections 42 of outer layer 16 by a roll-coating process in which a roller contacts the contact sections and only deposits adhesive on these surfaces and not on raised sections 44. It is also possible, for example, for adhesive layer 14 to be prepared in-situ and to be cut into thin strips of adhesive so that the film-like strips can be applied to the body and/or outer layers 12, 16. Once the adhesive is applied, the combined outer layer 16/adhesive layer 14 is brought into contact with confronting surface 30 of body layer 12 so that the adhesive may harden, cure and/or bond the various layers together. Heat treatments, ultraviolet (UV) radiation, pressure application, and other known methods may be used to cure adhesive layer 14. If metal panel assembly 10 undergoes minimal metal forming after outer layer 16 is bounded to body layer 12, then adhesive layer 14 will not be subjected to many internal and/or external forces and stress. In such a situation, adhesive layer 14 may not need to possess the level of internal integrity that would otherwise be required to withstand processes such as stamping, drawing, forming, etc.

An exemplary curing process is illustrated in FIG. 6, where an uncured metal panel assembly 10 is placed between upper and lower heated platens 60, 62. The two heated platens 60, 62 are then brought together to apply pressure and heat to adhesive layer 14 so that it cures in a proper manner. Upper heated platen 60 has multiple fingers 64 that extend towards uncured metal panel assembly 10 and are sized to contact an outer surface of outer layer 16 in between raised sections 44 so that they are not deformed or crushed during the curing process. This way, only those areas of metal panel assembly 10 that have uncured adhesive will be substantially heated during the process. The raised sections 44 and/or fingers 64 can be designed with draft angles or other features in order to facilitate separation of the upper and lower heated platens 60, 62 and removal of metal panel assembly 10 therefrom.

Figure 9:
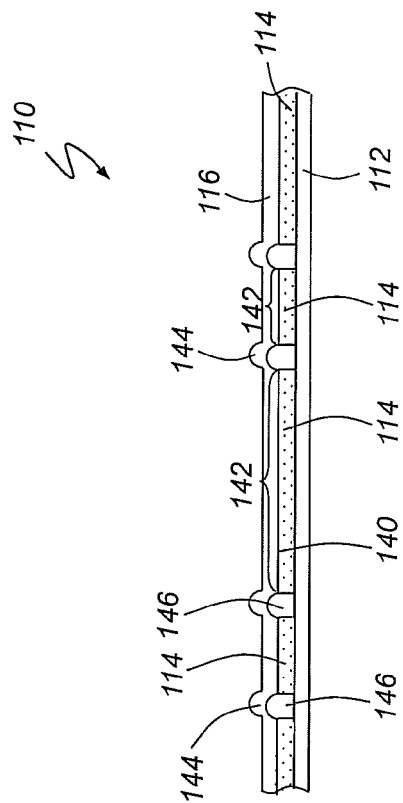
FIG. 9 is a side view of the exemplary metal panel assembly of FIGS. 7-8.
Figure 8:
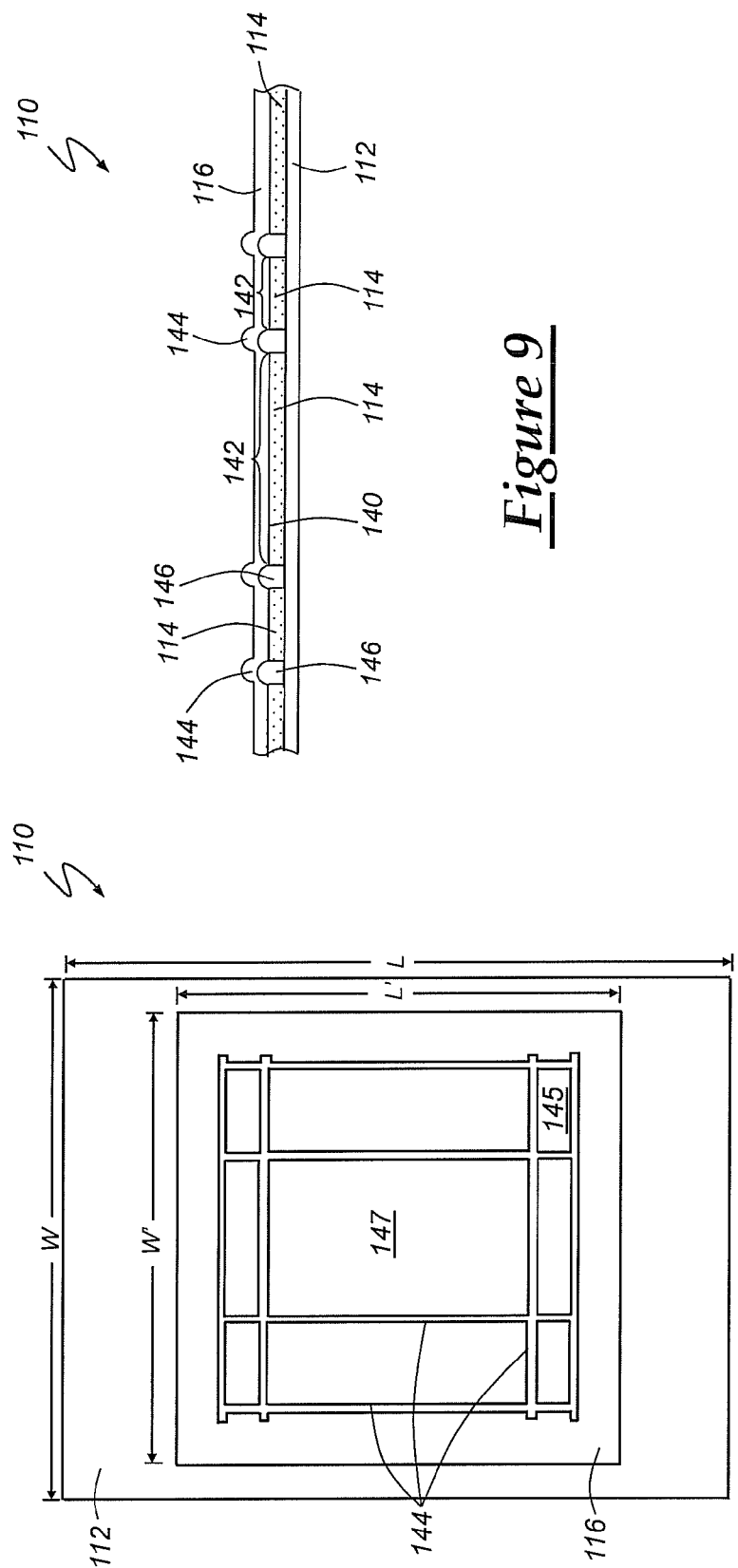

Referring to FIGS. 7-9, there is shown another exemplary embodiment of a metal panel assembly 110 that includes a body layer 112, an adhesive layer 114, and an outer layer 116, only the outer layer has raised sections 144 that are in the shape of rounded ribs and are in arranged in a grid-like pattern where they intersect and communicate with one another. Again, the exact shape, height, width, length, number, and direction of ribs 144 may vary from the exemplary embodiment shown here. For example, other grid patterns can include more, less and/or different raised sections to resist bending and other deformation. As best demonstrated in FIG. 9, metal panel assembly 110 is generally arranged in a sandwich-like construction where body layer 112 is flat, outer layer 116 includes a number of contact sections 142 on a contact surface 140 and raised sections or ribs 144 that each has a cross-sectional profile that resembles a half circle and forms a channel 146 between the body and outer layers. Ribs 144 can be located and concentrated in a stiffening area 145 to provide increased stiffness at that location, and can be absent in a damping area 147 in order to provide increased sound and vibration damping at that locality. Ribs 144 can be produced in outer layer 116 by a stamping process, or another suitable process and do not need to be in a grid-like arrangement, as that is only one possibility. In another embodiment, metal panel assembly 110 includes a number of rounded ribs arranged in a series of parallel columns or lines like the previous embodiment (i.e., a non-gridlike arrangement). Other arrangements may be used instead. It is possible for the body layer itself 112 and/or the outer layer itself 116 to be a laminate and/or a patch laminate and to include at least two separate rigid layers (e.g., metal layers) bonded together with a separate adhesive layer. In such a case, the adhesive layer in the body and/or outer layer laminate may be the same or different from adhesive layer 114, so that peak sound damping characteristics and adhesion levels can be tailored to meet the specific needs of the application.

In another exemplary embodiment (not shown), a metal panel assembly includes an outer layer with a number of raised sections that are in the form of dimples or bumps. These sections or features may be arranged in a pattern having columns and rows or they can be randomly distributed across the outer layer, to cite a few examples. Here too, the exact shape, height, width, length, number, direction, and the like, of the dimples may be dictated by the desired rigidity and stiffness to be imparted to the outer layer. The dimples or bumps can be produced in the outer layer by a stamping process or another suitable process.

There can sometimes be a give-and-take or trade-off relationship between improving stiffness or rigidity and reducing vibration and noise. Larger raised sections 44, 144 (especially ones that have a significant height that extends away from the body layer) tend to result in increased stiffness, but may also result in decreased vibration damping. One possible explanation involves the amount of metal/adhesive/metal layer sections and the so-called 'constrained layer effect'. In a traditional laminate where both the body and outer layers are flat and lie against one another, the entire area of the laminate has a metal/adhesive/metal layer interface or boundary which contributes to constrained layer sound damping. In the metal panel assembly described herein, however, there are channels or spaces 46, 146 where the body, adhesive and outer layers are not forming an interface. These non-interfaced sections may decrease the vibration damping ability of the metal panel laminate. Thus, it may be desirable to obtain an optimum arrangement that takes these sometimes competing objectives into account; examples of such arrangements or compromises include adjusting the size, shape, number, material and or thickness of contact sections 42, 142, of raised sections 44, 144, and/or of spaces 46, 146.

In any of the above-described embodiments, one or more individual spot welds may be provided to augment the joint or bond between body layer 12 and outer layer 16. In such an arrangement, the spot welds could be formed between contact sections 32, 42 of the body and outer layers 12, 16, respectively. Also, bolt holes, openings and/or other passages could be cut in metal panel assembly 10 via a piercing process that can be performed to body layer 12 and outer layer 16 separately when they are apart, or can be performed to the body and outer layers once they are adhered together by adhesive layer 14. Such bolt holes, openings and/or other passages are common in a vehicle firewall 22, for example.

Furthermore, the natural frequency of metal panel assembly 10 can sometimes be a concern in a given application. For example, in the vehicle firewall 22 of FIG. 2 it is desirable to have the natural frequency of metal panel assembly 10 be as different as possible from the natural frequency of other nearby components. Skilled artisans will appreciate that stiffness and mass, among other things, may have an effect on natural frequency and thus need attention in the design of metal panel assembly 10. Referring to FIG. 8, one exemplary body layer 112 is made of stainless steel, has a width W of 589 mm, a length L of 763 mm, and a thickness of 0.43 mm. The natural frequency of this exemplary body layer 112 when taken by itself and without adhesive layer 114 or outer layer 116 was 8.39 Hz. The exemplary outer layer 116 is made of galvanized steel, has a width W' of 508 mm, a length L' of 508 mm, and a thickness of 0.635 mm. When this exemplary outer layer 116 was adhered to body layer 112 with adhesive layer 114, the resulting natural frequency of the overall metal panel assembly 110 was increased to about 17.4 Hz. It may oftentimes be beneficial for vibration and noise damping purposes for a certain structure to have a higher, and thus more attenuated, natural frequency. In this case, testing showed that the intensity of the vibrations that were transmitted through metal panel assembly 110 were approximately one-fourth of those that were transmitted through body layer 112 by itself.

It is to be understood that the foregoing description is not a definition of the invention itself, but is a description of one or more preferred exemplary embodiments of the invention. The invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "e.g.," "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A metal panel assembly, comprising:
   a sound damping adhesive layer;
   a body layer; and
   an outer layer having a plurality of contact sections that confront the body layer through the sound damping adhesive layer and a plurality of raised sections that are spaced from the body layer, wherein at least some of the contact sections that confront the body layer through the sound damping adhesive are located in an interior of the outer layer and at least some of the raised sections are arranged in a grid-like pattern so that they intersect one another, and the contact sections are arranged to help dampen vibrations and/or noise in the metal panel assembly and the grid-like pattern of raised sections are arranged to help stiffen the metal panel assembly so that the outer layer both reduces vibrations and/or noise and stiffens the underlying body layer.

2. The metal panel assembly of claim 1, wherein the sound damping adhesive layer is a viscoelastic adhesive layer and is comprised of an acrylate-based thermoset resin that works with the body layer and the outer layer to form a constrained layer structure.

3. The metal panel assembly of claim 1, wherein the body layer and the outer layer are comprised of metal, and the sound damping adhesive layer is located between the metal body layer and the metal outer layer so that the two layers do not physically contact one another.

4. The metal panel assembly of claim 1, wherein the body layer includes a plurality of raised contact sections that extend away from the rest of the body layer towards the outer layer like platforms to confront the contact sections of the outer layer through the sound damping adhesive layer.

5. The metal panel assembly of claim 1, wherein the body layer itself is a laminate that is comprised of at least two separate rigid layers bonded together with a separate adhesive layer.

6. The metal panel assembly of claim 1, wherein at least some of the contact sections of the outer layer are elongated strips that are generally parallel to the body layer and are separated from the body layer through the thickness of the sound damping adhesive layer.

7. The metal panel assembly of claim 1, wherein at least some of the raised sections of the outer layer are elongated channels that are separated from the body layer by a plurality of elongated spaces.

8. The metal panel assembly of claim 7, wherein each of the elongated channels includes a first inclined portion connected along an edge to a first contact section, a second inclined portion connected along an edge to a second contact section, and a flat portion that is generally parallel to the body layer and is connected along a first edge to the first inclined portion and is connected along a second edge to the second inclined portion.

9. The metal panel assembly of claim 8, wherein the first and second inclined portions of the outer layer are arranged at an acute angle α.

10. The metal panel assembly of claim 1, wherein the contact sections of the outer layer are generally parallel to the body layer and are separated from the body layer through the thickness of the sound damping adhesive layer, and the raised sections of the outer layer are elongated rounded ribs and are separated from the body layer by elongated channels.

11. The metal panel assembly of claim 1, wherein at least some of the raised sections of the outer layer are generally perpendicular to one another and are arranged in the grid-like pattern so that they cross one another, and the raised sections of the outer layer are elongated rounded ribs and are separated from the body layer by elongated channels.

12. The metal panel assembly of claim 1, wherein the outer layer is a metal patch with a smaller surface area than that of the body layer, and the metal patch is applied to a particular area of interest on the body layer so that it helps dampen vibrations and/or noise in the metal panel assembly and helps stiffen the metal panel assembly.

13. The metal panel assembly of claim 1, wherein the outer layer itself is a laminate that is comprised of at least two separate rigid layers bonded together with a separate adhesive layer.

14. A metal panel assembly, comprising:
- a thin sound damping adhesive layer having a thickness of about 0.005 mm to 0.05 mm, inclusive;
- a metal body layer; and
- a metal outer layer having a plurality of flat contact sections that confront the body layer through the thin sound damping adhesive layer to form a constrained layer structure, and a plurality of raised sections that are spaced from the body layer across a plurality of spaces to form a series of stiffening features, wherein the metal outer layer is a patch that is attached to a particular area of interest on the metal body layer and includes a non-uniform distribution of contact sections and raised sections across the metal outer layer with a concentration of contact sections located in a damping area to help dampen vibrations and/or noise in the metal panel assembly and with a concentration of raised sections located in a stiffening area to help stiffen the metal panel assembly.

15. A method for manufacturing a metal panel assembly, comprising the steps of:
(a) providing a metal body layer;
(b) providing a metal outer layer having one or more elongated contact sections and one or more elongated raised sections;
(c) applying a sound damping adhesive layer between the metal body layer and the metal outer layer by roll coating the adhesive to the underside of the metal outer layer so that only the contact sections are coated with adhesive;
(d) bringing the metal outer layer and the metal body layer together so that the contact sections of the metal outer layer confront the metal body layer through the sound damping adhesive layer; and
(e) curing the sound damping adhesive layer.

16. The method of claim 15, wherein step (b) further comprises roll forming the metal outer layer so that a plurality of elongated contact sections and a plurality of elongated raised sections are formed in the metal outer layer, wherein the pluralities of elongated contact sections and raised sections are generally parallel to one another.

17. The method of claim 15, wherein steps (d) and (e) further comprise using upper and lower heated platens to bring the metal outer layer and the metal body layer together and cure the sound damping adhesive layer, where at least one of the upper and lower heated platens includes a plurality of fingers that are sized and shaped to contact the elongated contact sections of the metal outer layer but not contact the elongated raised sections of the metal outer layer.

* * * * *

UNITED STATES PATENT AND TRADEMARK OFFICE
CERTIFICATE OF CORRECTION

| | | |
|---|---|---|
| PATENT NO. | : 8,720,641 B2 | Page 1 of 1 |
| APPLICATION NO. | : 13/388625 | |
| DATED | : May 13, 2014 | |
| INVENTOR(S) | : Jonathan W. Fisk et al. | |

It is certified that error appears in the above-identified patent and that said Letters Patent is hereby corrected as shown below:

In the Specification

Column 4, line 59, delete "100" and insert --1.00--

Column 6, line 13, after "forming" insert --.--

Signed and Sealed this
Twelfth Day of August, 2014

Michelle K. Lee
*Deputy Director of the United States Patent and Trademark Office*